(No Model.)

J. R. JOHNS.
PNEUMATIC TIRE.

No. 585,870. Patented July 6, 1897.

Witnesses.
A. B. Digges
Joseph W. Burll

Inventor.
Jacob R. Johns,
by Edwin Cruse,
Asso. Attorney.

UNITED STATES PATENT OFFICE.

JACOB R. JOHNS, OF DENVER, PENNSYLVANIA.

PNEUMATIC TIRE.

SPECIFICATION forming part of Letters Patent No. 585,870, dated July 6, 1897.

Application filed July 14, 1896. Serial No. 599,110. (No model.)

*To all whom it may concern:*

Be it known that I, JACOB R. JOHNS, a citizen of the United States, residing at Denver, county of Lancaster, State of Pennsylvania, have invented certain new and useful Improvements in Pneumatic Tires, of which the following is a specification.

This invention has relation to that class of tires protected from puncture by armors embodying a series of metallic plates attached to and connected by a metallic band and constructed and arranged to encircle the tread of the tire.

The object of the invention is to increase the elasticity of such armors without loss of strength or stability, to provide one which will prevent slippage of the wheel, to simplify the means of attaching the armor to the tire, and to otherwise improve the construction of such devices without adding to the cost thereof.

Figure 1:
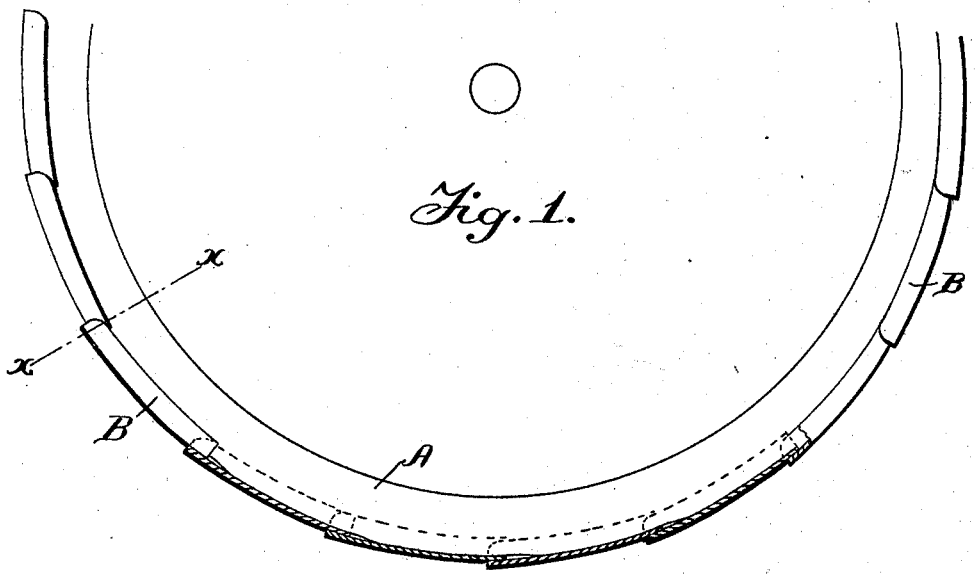
Figure 2:
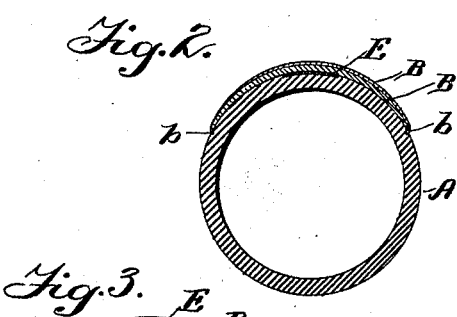
Figure 5:
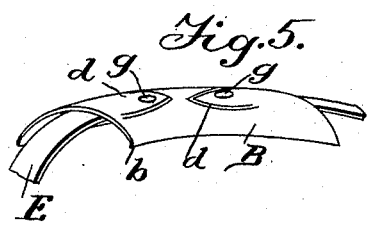
Figure 3:
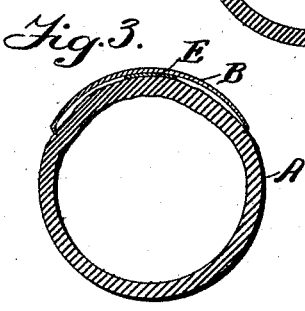
Figure 4:
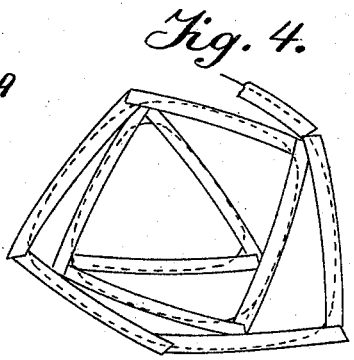
Figure 6:
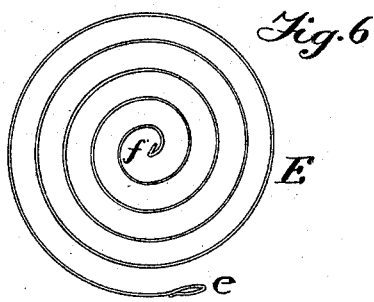

Figure 1 is an elevation of an inflated pneumatic tire, showing my overtire or guard applied thereto, a portion of the latter being shown in longitudinal section. Fig. 2 is an enlarged cross-sectional view of the tire on the line $x\ x$ of Fig. 1. Fig. 3 is a similar view to Fig. 2, but representing the pneumatic tire as it might appear before being inflated. Fig. 4 shows my overtire separately and in the folded form which it automatically assumes when freed from the wheel. Fig. 5 shows in perspective one of the sections or plates with a portion of the uniting spring-band attached. Fig. 6 shows the spring-band as it appears before having the sections or plates secured to it.

A represents a pneumatic tire of any ordinary form, except that the large increase of material usually provided at the tread is preferably dispensed with as unnecessary in connection with my invention, thereby effecting a saving in weight and cost. Instead of relying upon such extra material in the tire itself, as heretofore, I provide what may be appropriately called an "overtire," because, like an overshoe or the like, it is an independent device, readily applicable to the tire proper and adapted to protect the latter from practically all direct contact with the road-bed. This overtire is made up of a series of sections or curved plates B, each of which is formed so as to approximately fit the surface of the pneumatic tire when the latter is inflated—that is, with a lengthwise curve having a radius equal to the exterior diameter of the complete tire and with a crosswise curve of a radius corresponding with the cross-section of the same. (Shown in Fig. 2.) The side edges $b\ b$ of each plate are preferably turned inward, as shown, so as to press somewhat into the yielding material of the tire, and the thickness of the plate may be gradually decreased from the middle $c$ toward said edges, so as to provide the greatest strength with a minimum of material. The exterior surface, which contacts with the road-bed, may also be formed with rib-like projections $d$ or equivalent roughening adapted to prevent slippage. These ribs also serve the important purpose of stiffening the plates, so that the latter may be very light and yet have sufficient strenght, being perfectly cushioned upon the tire. These plates are connected together so as to form a flexible belt by means of a relatively wide and thin band E, preferably of sheet-steel, coiled into a helix, as shown in Fig. 6, and having its opposite ends $e$ and $f$ provided with connecting devices, such as the hook and eye indicated. Each plate B is riveted at points $g\ g$ to the band E with one end lapping over and the other under the adjoining sections. This arrangement combines lateral rigidity with the greatest lengthwise flexibility, and at the same time causes the complete belt to naturally fold up into the most convenient and compact form for carriage, as shown in Fig. 4, and also facilitates its application to the pneumatic tire, as hereinafter described.

My overtire is readily applicable to any pneumatic tire, as follows: Before inflating the latter place the overtire in position upon it. This is easily done, as it fits the tire loosely. Now pump up the tire in the usual manner. As the air-pressure increases the yielding material of the tire or, if preferred, of an interposed lining (not shown) is pressed into the slight irregularities of the sectional overtire, so as to secure the latter firmly and at the same time close the junctions of the overlapping sections, as well as the lateral edges of the latter, against the intrusion of sand and dirt of all kinds, the laps of the sections being arranged, as shown in Fig. 1, so as to minimize the tendency to collect sand on the free ends and permit of the use of any ordinary brake on the overtire.

As the weight of the rider comes upon any particular section B of the overtire the pressure upon the pneumatic tire, which yields perfectly and freely beneath the flexible overtire, is distributed to the adjacent sections of the latter, each of which partakes to some extent of the radial movement resulting from the yielding of the pneumatic cushion, so that the disturbance at any one junction is practically so little as to be unobjectionable.

Having thus fully described my invention in the specific form which I consider preferable, I do not desire to limit myself to this particular construction; but

What I claim is—

The herein-described overtire or armor for pneumatic tires, consisting of a series of plates each of which is curved laterally and longitudinally and is formed with rib-like projections serving both to stiffen the plate and prevent slippage of the wheel, the ends of each plate overlapping and underlapping the contiguous ends of the adjacent plates, and a helically-coiled spring secured to said plates and connecting the same, said spring having its ends relatively formed to engage each other and attach the overtire around the tire proper, substantially as described.

In testimony whereof I affix my signature in presence of two witnesses.

JACOB R. JOHNS.

Witnesses:
H. H. STROBLE,
E. B. WOLF.